Reissued May 31, 1949 Re. 23,119

UNITED STATES PATENT OFFICE 23,119

OIL-SOLUBLE DRIER METAL SALT COMPOSITIONS

Alfred Fischer, Bronx, N. Y., assignor to Nuodex Products Co., Inc., Elizabeth, N. J., a corporation of New York No Drawing. Original No. 2,456,824, dated December 21, 1948, Serial No. 682,586, July 10, 1946. Application for reissue January 25, 1949, Serial No. 72,741

6 Claims. (Cl. 106—310)

This invention relates to oil-soluble metal salt compositions useful in several arts for various purposes, such, for example, as in connection with paint and varnish driers, bodying agents, catalysts, lubricant additives, etc.

The oil-soluble salts of diverse organic acids are in use for many different purposes. For example, the drying metal salts; that is, principally lead, cobalt, manganese, iron, zinc and nickel salts of certain organic acids; for example, naphthenic acids, tall oil acids, rosin acids, linseed acids, 2-ethylhexoic acid, etc., are widely used as paint, varnish and printing ink driers. The lead salts of certain acids, such as naphthenic acids, are employed not only as driers, but also to impart certain desirable characteristics to lubricants.

Heavy metal and alkali earth metal salts are generally water-insoluble. Their commercial utility depends upon their ability to dissolve in and to be stable in the organic solvents and vehicles for which they are intended. For example, in the case of cobalt, manganese and lead driers they are usually employed in compositions containing drying oils such as linseed oil. In order that they may function properly it is necessary that they be soluble in such oils and many other types of vehicles used in paints, varnishes and printing inks. Similarly a copper salt, intended for use in fungicides, should be soluble in certain organic vehicles, such as creosote oils, with which it is often associated in fungicidal compositions. Zinc salts, such as zinc naphthenate, are employed commercially as wetting agents in paints and varnishes. For such application it is desirable that these salts be soluble in the vehicles of such compositions.

The metal salts, referred to above, are sometimes employed in solid form; i. e., in the absence of a solvent, but more often they are employed in the form of concentrated liquid solvent solutions. Heretofore, serious difficulties have been experienced in the commercial use of the above described metal salts because they lack the necessary element of solubility. Equally serious troubles are experienced in the preparation of such metal salts and their solutions.

Some of the most serious defects of prior metal salts are as follows:

1. Generally, solvent solutions are of objectionably high consistency at the maximum concentration which is preferable from the standpoint of economics and other reasons.

2. These metal soaps in form of their concentrated solutions, as well as when incorporated into the ultimate compositions for which they may be intended, sludge out during storage; that is, a portion of the active constituent becomes inactive.

3. These metal salts are often only incompletely soluble in solvents which are intended for the preparation of their concentrated solutions, as well as in the ultimate vehicles and compositions for which they are intended.

4. The solvent solutions generally contain, for the purpose of minimizing their tendency towards sludging and their lack of solubility, relatively high proportions of organic acids. They may carry as much as 25% of free acids for this purpose. This means that a relatively high amount of extraneous matter is introduced along with the active principal. It also means that, were it not for the presence of such free acid, the concentration of the metal salt in such solutions would be increased.

5. These solutions in many cases do not retain their initial useful low viscosity, but rather tend to increase in viscosity upon aging, sometimes to the gelation point.

Various attempts have been made in the past to cope with these disadvantages. Besides the use of free organic acids, certain other agents have also been suggested. For example, certain alcohols have been recommended. However, their use is attended by certain drawbacks such as volatility, relatively low degree of efficiency, etc.

As a result of protracted research and tests, it has now been discovered that it is possible to eliminate all of these disadvantages and others and produce compositions which will function with high efficiency. This is accomplished, according to the present invention, by the use of alkyl acid phosphates. These alkyl acid phosphates greatly reduce the viscosity of solutions of oil-soluble metal salts and greatly improve the stability and solubility of such solutions. Furthermore, they make it possible to effect considerable economies in the preparation of such compositions.

These stabilizing agents are of very low vapor pressure and thus will remain permanently associated in the compositions in which they are incorporated. The amount of stabilizing agent needed is relatively small, as low as .25% per total weight of the heavy metal salt solutions having effected marked changes, but it may be found desirable in some cases to use considerably higher percentages of such stabilizing agents. Generally speaking, we have found that from 1% to 3% produces commercially satisfactory results. There may be applications where even as much as 10% of these agents may be employed.

Often it is desirable to retain some amounts of the usual organic acids in conjunction with these stabilizing agents.

Another very important advantage in the use of these stabilizing agents has been found in their pronounced peptizing and de-emulsifying effect upon solutions of heavy metal salts and alkali earth metal salts during the process of manufacture.

It is quite common that water-insoluble heavy metal and alkali earth metal salts are produced by double decomposition in the presence of a water immiscible solvent for the salt thus formed. For example, U. S. Patent No. 2,113,496 describes the operation of such a process. In carrying out that process, certain impurities, originally present in the organic acids, may cause some emulsification which results in difficulties in separating the two phases as well as in reduced yields of the end product. Through the use of the stabilizing agents of this invention, these difficulties are eliminated or minimized so that smoother production and better yields are obtained. In the past the hazard of emulsification has often required the use of considerable amounts of free organic acids to minimize these tendencies. Through the use of these stabilizing agents the amount of free acid necessary for de-emulsification may be entirely eliminated or at least greatly reduced.

Other features and advantages of the invention will hereinafter appear in connection with the following illustrative examples. These examples are, by way of illustration, only, and are not intended to be all inclusive of this invention.

The alkyl acid phosphates of this invention are compounds with the general formula $$R—H_2—PO_4 \text{ or } R—R—HPO_4$$

as well as combinations of both. In these formulae, "R" represents an alkyl radical.

EXAMPLE 1

In this example, a manganese naphthenate has been prepared without the agent of this invention, but employing approximately 10% of free naphthenic acid so as to make the product commercially acceptable. The end product is a mineral spirits solution of manganese naphthenate carrying 6% manganese metal.

625 lbs. of a 14% caustic soda solution is added to a mixture of 512 lbs. of naphthenic acid (acid number 240 mg.) in 389 lbs. of mineral spirits. This results in a substantially "neutral" soap mixture; that is, it contains neither free acid nor free alkali. 100 lbs. of naphthenic acid is then added. This corresponds to 10% of the finished product. The temperature of the mixture is raised to 180° F. and to it with agitation is added 750 lbs. of an aqueous, manganese sulfate solution containing 8% manganese. After agitation, the mixture is allowed to stratify into an upper mineral spirits layer containing manganese naphthenate and a lower aqueous layer. The latter is run off and the upper mineral spirits layer is dried in vacuo. The final dry product is adjusted with mineral spirits so that the manganese content is 6%.

Stratification in this preparation is fair and the product is stable (does not gel). The viscosity of this product is 125 C. P. S. at 80° F. and has from poor to fair solubility in alkali refined linseed oil. The heat stability of this product is very poor. Thus the viscosity of the product originally at 125 C. P. S. at 80° rises to 200 C. P. S. at 80° F. after heating at 320° F. for 3 hours. The alkali refined linseed oil solubility, which was fair originally, becomes very poor after such heat treatment.

The product of this example represents the best commercial grade that could be produced prior to this invention.

EXAMPLE 2

This example shows the addition of amyl acid phosphate to an already prepared manganese naphthenate drier solution carrying 6% manganese metal.

2% amyl acid phosphate is incorporated into a commercial 6% manganese naphthenate liquid drier. The commercial product is considerably improved. Its viscosity is reduced from 300 C. P. S. to 100 C. P. S. The alkali refined linseed oil solubility which was fair becomes excellent. The original product is rendered stable to heating; that is, the viscosity (100 C. P. S.) and the alkali refined linseed oil solubility (excellent), remain unaffected after heating at 320° F. for 3 hours.

EXAMPLE 3

This example shows the addition of butyl acid phosphate to an already prepared manganese naphthenate drier solution carrying 6% manganese metal.

1.75% butyl acid phosphate is incorporated into a commercial 6% manganese naphthenate liquid drier. The commercial product is considerably improved. Its viscosity is reduced from 300 C. P. S. to 100 C. P. S. The alkali refined linseed oil solubility which was fair becomes excellent. The original product is rendered stable to heating; that is, the viscosity (100 C. P. S.) and the alkali refined linseed oil solubility (excellent), remain unaffected after heating at 320° F. for three hours.

EXAMPLE 4

This example shows the addition of octyl acid phosphate to an already prepared manganese naphthenate drier solution carrying 6% manganese metal.

2.5% octyl acid phosphate is incorporated into a commercial 6% manganese naphthenate liquid drier. The commercial product is considerably improved. Its viscosity is reduced from 300 C. P. S. to 100 C. P. S. The alkali refined linseed oil solubility which was fair, becomes excellent. The original product is rendered stable to heating; that is, the viscosity (100 C. P. S.) and the alkali refined linseed oil solubility (excellent), remain unaffected after heating at 320° F. for 3 hours.

EXAMPLE 5

This example shows the use of propyl acid phosphate as a stabilizer in a manganese naphthenate solution in mineral spirits carrying 6% manganese metal.

To a commercial manganese naphthenate drier of 6% manganese metal content there is added 4% of a dilution of propyl acid phosphate. This dilution is made by dissolving equal parts by weight of the phosphate and the ethylene glycol monoethyl ether. The manganese drier solution thus modified shows a considerably lower viscosity than the unmodified material and it will also be resistant to increase in viscosity, even upon heating at 320° F. for three hours.

Example 6

This example shows the use of amyl acid phosphate in reducing the viscosity of a mineral spirits solution of copper naphthenate carrying 8% copper metal.

1% amyl acid phosphate is added to a commercial 8% copper naphthenate solution. The viscosity is reduced from 27 seconds to 17 seconds at 80° F. on a Gardner-Parks mobilometer with no load.

Example 7

This example shows the use of butyl acid phosphate in reducing the viscosity of a xylol solution of calcium naphthenate carrying 5% calcium metal.

2.25% butyl acid phosphate is added to a commercial 5% calcium naphthenate solution. The viscosity is reduced from 37 seconds to 10 seconds at 80° F. on a Gardner-Parks mobilometer with a 200 gram load.

Example 8

In this example a commercial grade of a xylol solution of the calcium salt of 2-ethylhexoic acid was first prepared. The solution carried 5% of calcium metal in the form of the salt. The solution thus made showed an initial viscosity of 340 C. P. S. at 80° F. There was then added to this solution 3% by weight of the propyl acid phosphate. The viscosity of the calcium salt solution was reduced down to 50 C. P. S.

Example 9

A commercial grade of a copper oleate paste in creosote oil was first prepared so as to carry 7% of copper metal. To this paste was then added 3% by weight of amyl acid phosphate. The viscosity of the composition which, before the addition, was 4630 C. P. S. dropped, after the addition, to 435 C. P. S.

Example 10

A commercial grade of a copper salt of tall oil acids was first prepared in a solution of toluol. This solution carried 6% copper metal. There was then added 3% of octyl acid phosphate. The viscosity of the composition dropped from the initial viscosity of 627 C. P. S., before the addition of the agent, down to 320 C. P. S. Another important advantage, resulting from the additive agent, was the great improvement in storage stability. Whereas the solution, without the modification, loses its homogeneity after several months standing, the modified product retained its initial homogeneous character permanently.

Example 11

A commercial grade of cobalt linoleate of 9% cobalt metal content, was first prepared by fusion of cobalt acetate and linseed oil fatty acids by standard commercial procedure. The end product was then introduced into linseed oil (which required heating and agitating), so as to provide 2% cobalt metal content in the linseed oil. The dilution of the cobalt linoleate thus prepared showed serious instability after several days standing. There were some discrete particles of the cobalt drier which had separated away from the oil and overall gelation had begun. When to the same solid cobalt linoleate, an addition of 4% of the isopropyl acid phosphate was made, the thus modified cobalt drier rendered stable and homogeneous dilutions with the linseed oil.

Example 12

A commercial grade of lead linoleate drier was modified through the addition of 3% of octyl acid phosphate. It was found that this modification showed greatly improved stability characteristics in various drying vehicles as compared with the unmodified material.

Example 13

A batch of aluminum oleate was modified through the addition of 1% of amyl acid phosphate. When dilutions of the aluminum soaps in benzol were made so as to carry 10% of the aluminum soaps, it was found that the viscosity of the dilution of the modified soap showed a viscosity of only 50 C. P. S. By contrast, the dilution of the unmodified soap was a viscous gel.

Example 14

A manganese drier solution in mineral spirits, carrying 8% manganese metal, was prepared from a combination of naphthenic acid and 2-ethylhexoic acid. These acids were used in equal weight proportions in the preparation of the drier. To a portion of the drier thus prepared, 2% of isopropyl acid phosphate was added. The change in characteristics of the drier are shown in the table.

*Table*

| | Modified with: 2% isopropyl acid phosphate | Unmodified |
|---|---|---|
| Storage Stability | Stable indefinitely. | Gels within few days. |
| Viscosity in C. P. S. at 80° F. | 50 | 550. |
| Alkali Refined Linseed Oil Solubility. | Excellent | Poor. |
| Heat Stability (3 hours at 320° F.) Viscosity in C. P. S. at 80° F. | 50 | 1290. |
| Alkali Refined Linseed Oil Solubility, After Heating for 3 Hours at 320° F. | Excellent | Very poor. |

Example 15

A typical combination drier comprising lead and cobalt was first prepared. This drier, representing a linseed oil-rosin solution of lead and cobalt linoleate, carried, respectively, 1% cobalt metal and 4% lead metal. To a portion of this drier was then added 3% of isopropyl acid phosphate. The drier thus modified was clear and stable on long storage, whereas the unmodified drier showed considerable sludging and instability on aging.

Example 16

To a mineral spirits solution of a commercial grade of copper oleate carrying 7% copper metal, was added 1.5% each of amyl acid phosphate and isopropyl acid phosphate. The modified solution showed a viscosity of only 400 C. P. S. By contrast the unmodified solution showed a viscosity of over 4000 C. P. S.

Example 17

To a commercial grade of a manganese naphthenate drier solution in mineral spirits carrying 6% manganese metal, there was added 2% of octyl acid phosphate and .5% of amyl acid phosphate. This modification showed greatly improved stability and solubility characteristics as compared with the initial material. The viscosity also was greatly reduced as a result of this modification.

EXAMPLE 18

A commercial grade of an iron tallate catalyst was prepared in the usual manner. The end product carried 8% iron metal. To a portion of this end product, there was then added 5% of butyl acid phosphate. The unmodified, as well as the modified catalyst were then introduced into typical core oil compositions. It was found that the modified catalyst possessed much better solubility and compatibility with the core oil than the unmodified catalyst.

EXAMPLE 19

A fungicidal solution in toluol of cadmium naphthenate carrying 8% cadmium metal, was first prepared by standard methods. To a portion of the solution thus prepared there was then added 3% of amyl acid phosphate. This addition reduced the initial viscosity of 627 C. P. S. at 80° F. to 6 C. P. S. It was also observed that the modified solution possessed much better stability in organic vehicles than the unmodified product.

EXAMPLE 20

The zinc salt of 2-ethylhexoic acid was first prepared by a fusion of zinc oxide and 2-ethylhexoic acid. The end product was then dissolved in a hydrogenated petroleum solvent sold under the name "Solvesso #1" by the Standard Oil Company of New Jersey and consisting of a mixture of approximately 65% aliphatic hydrocarbons of boiling range 250°–350° F. and 35% of methylated monocyclic aromatic hydrocarbons. The solution carried 10% of zinc metal. When to this solution, 2% of isopropyl acid phosphate was added, the initially high viscosity of the solution was reduced from approximately 9800 C. P. S. at 80° F. to 3600 C. P. S. It was also determined that the modification greatly improved the solubility and compatibility of the zinc salt in many organic vehicles.

The foregoing examples illustrate the preferred forms of this invention, but the invention is to be understood as fully commensurate with the appended claims, for I am fully aware of the fact that, in addition to the examples of the alkyl acid phosphates enumerated, a great many others will also operate within the purview of this invention.

Having thus fully described the invention, what I claim as new and desire to secure by Letters Patent is:

1. A composition of matter consisting essentially of an oil-soluble drier metal salt and a lesser amount of an alkyl acid phosphate wherein the alkyl group embodies not more than 8 carbon atoms.

2. A composition of matter consisting essentially of an oil-soluble drier metal salt and a lesser amount of an amyl acid phosphate.

3. A composition of matter consisting essentially of an oil-soluble drier metal salt of naphthenic acid and a lesser amount of an alkyl acid phosphate wherein the alkyl group embodies not more than 8 carbon atoms.

4. A composition of matter consisting essentially of an oil-soluble drier metal salt of naphthenic acid and a lesser amount of an amyl acid phosphate.

5. A composition of matter consisting essentially of an oil-soluble drier metal salt and a lesser amount of a butyl acid phosphate.

6. A composition of matter consisting essentially of an oil-soluble drier metal salt and a lesser amount of an isopropyl acid phosphate.

ALFRED FISCHER.

No references cited.